United States Patent [19]

Wright

[11] Patent Number: 4,896,469
[45] Date of Patent: Jan. 30, 1990

[54] PREFABRICATED BUILDING PANEL ASSEMBLY

[76] Inventor: John T. Wright, 331 Groffs Mill Rd., E64, Harleysville, Pa. 19440

[21] Appl. No.: 282,899

[22] Filed: Dec. 12, 1988

Related U.S. Application Data

[63] Continuation of Ser. No. 88,724, Aug. 19, 1987, abandoned.

[51] Int. Cl.⁴ .......................... E04F 17/08; E04B 2/00
[52] U.S. Cl. ....................................... 52/221; 52/241; 52/481; 52/586
[58] Field of Search ............... 52/221, 802, 481, 803, 52/242, 238, 241, 239, 586, 220

[56] References Cited

U.S. PATENT DOCUMENTS

| | | | |
|---|---|---|---|
| 2,129,441 | 9/1938 | Otto | 52/586 |
| 2,371,300 | 3/1945 | Kaufman | 52/241 |
| 3,310,926 | 3/1967 | Brandreth | 52/281 |
| 3,348,459 | 10/1967 | Harvey | 52/586 |
| 3,415,026 | 12/1968 | Tillisch | 52/586 |
| 3,621,624 | 11/1971 | Gustafson | 52/220 |
| 4,006,568 | 2/1977 | Pertl | 52/241 |
| 4,018,020 | 4/1977 | Sauer | 52/241 |
| 4,089,144 | 5/1978 | Astl | 52/586 |
| 4,125,972 | 11/1978 | Pate | 52/586 |
| 4,312,158 | 1/1982 | Teli | 52/241 |

FOREIGN PATENT DOCUMENTS

| | | | |
|---|---|---|---|
| 1243513 | 9/1960 | France | 52/238.1 |
| 1784413 | 8/1973 | Fed. Rep. of Germany . | |

*Primary Examiner*—John E. Murtagh
*Attorney, Agent, or Firm*—Evelyn M. Sommer

[57] ABSTRACT

A prefabricated building panel assembly and connecting members are provided. The panel assembly comprises a plurality of parallel spaced apart studs and a pair of parallel outer panels affixed to opposite sides of the array of studs. The studs are dimensioned to terminate interiorly of the periphery of the prefabricated panel assembly. Connecting members comprising a pair of parallel flanges affixed to and extending from a web also are provided. The connecting members are dimensioned to fit between the outer panels of the prefabricated panel assembly. The connecting members are positioned with the channel defined between the flanges facing inwardly. Utilities may be advanced through the channels defined by the connecting members and through the spaces between the studs.

8 Claims, 1 Drawing Sheet

PREFABRICATED BUILDING PANEL ASSEMBLY

This application is a continuation of application Ser. No. 088,724 filed Aug. 24, 1987, now abandoned.

BACKGROUND OF THE INVENTION

Attempts have been made to provide prefabricated building components to reduce the amount of fabrication and construction that must take place at the building site. Prefabrication enables various manufacturing and assembly steps to be carried out under controlled factory conditions, and substantially reduces the number of personnel and the types and quantity of equipment and supplies that must be transported to the building site.

Many of the prior art prefabricated building components have been prefabricated panels that would define all or part of a wall. The prefabricated building panel typically would include at least an array of internal supporting members and at least one outer layer which may be either a rough sheathing or a finished layer.

U.S. Pat. No. 4,201,020 which issued to Saunders on May 6, 1980, shows one of the many prior art prefabricated building panels. The structure shown in U.S. Pat. No. 4,201,020 includes an array of internal supporting studs and outer layers of particle board, gypsum board or the like. The supporting structures comprise longitudinally extending supporting members which extend substantially the entire length of the panel and transverse supporting members extending between and connecting the longitudinal supporting members. One edge of each panel shown in U.S. Pat. No. 4,201,020 includes an elongated tongue, while the opposed edge includes a corresponding groove. Thus, adjacent panels can be connected in end to end relationship. However, to connect panels in perpendicular relationship, it is necessary to partly disassemble the adjacent panels. Furthermore, U.S. Pat. No. 4,201,020 provides no convenient means for accommodating utilities, insulation and the like within the panel.

Another prefabricated panel structure is shown in U.S. Pat. No. 1,136,792 which issued to Goldsmith on Apr. 20, 1915. The panel shown in U.S. Pat. No. 1,136,792 includes a plurality of elongated generally L-shaped panel components. The components are connected to one another such that the narrow legs thereof define transverse supporting members for the completed panel, and such that the wide legs thereof are interconnected to define a portion of one of the opposed walls of the prefabricated panel. The walls may be perforated to receive plaster or the like. Although a plurality of such L-shaped members may be connected to create a panel of any required length, U.S. Pat. No. 1,136,792 does not suggest any means for interconnecting panel members perpendicular to one another or for extending utilities laterally through the panels.

U.S. Pat. No. 4,165,591 issued to Fitzgibbon on Aug. 28, 1979 and shows a prefabricated panel having a plurality of longitudinally extending supporting members, transversely extending supporting members connecting the respective tops and bottoms of the longitudinal members and a pair of opposed parallel outer layers. The outer layers may be plywood, or the like, and extend beyond the respective transversely extending top and bottom members to effectively define top and bottom channels. Connecting members may be disposed in these channels to connect a plurality of such panels in edge to edge relationship. Although U.S. Pat. No. 4,165,591 shows utility lines disposed in certain panels, these lines must be put in place by drilling, cutting and similar techniques that are required for walls that are not prefabricated.

Another prefabricated panel structure is shown in U.S. Pat. No. 3,498,014 which issued to Fergen on Mar. 3, 1970. The panel system shown in U.S. Pat. No. 3,498,014 includes a plurality of parallel transversely extending supporting members with an outer layer, such as plywood, nailed to one side. The opposed side of the transversely extending supporting members has a plurality of parallel longitudinally extending spaced apart members nailed thereto. The system shown in U.S. Pat. No. 3,498,014 thus provides accessibility to the panel from one side and permits transverse extension of utility lines and such. However, U.S. Pat. No. 3,498,014 does not provide any means for longitudinal extension of utility lines without cutting through the transverse supporting members. Furthermore, U.S. Pat. No. 3,498,014 requires the interior layer to be affixed at the construction site.

Other prefabricated panel structures are shown in U.S. Pat. No. 4,378,663 which issued to Audet on Apr. 5, 1983; U.S. Pat. No. 3,958,388 which issued to Hawes on May 25, 1976; U.S. Pat. No. 3,732,138 which issued to Almog on May 8, 1973; U.S. Pat. No. 2,669,860 which issued to Bell on Feb. 23, 1954; U.S. Pat. No. 2,432,979 which issued to Attwell on Dec. 23, 1947; French Pat. No. 669,843 and Italian Pat. No. 421,933.

Although all of the prior art panels described above eliminate certain on-site fabrication, these references do not readily accommodate the placement of utility lines and do not readily accommodate the interconnection of panel members in both edge to edge relationship and perpendicular relationship.

Accordingly, it is an object of the subject invention to provide a prefabricated panel that facilitates the interconnection of panels at the building site.

It is another object of the subject invention to provide a prefabricated panel that greatly facilitates the passage of utility lines.

It is a further object of the subject invention to provide a prefabricated assembly of panels that can be connected in edge to edge, end to end or perpendicular relationship to other such panels.

An additional object of the subject invention is to provide a prefabricated panel that can be made from any of the readily available construction materials.

Still a further object of the subject invention is to provide a prefabricated panel system that can be assembled by unskilled personnel with readily available construction tools. Standard carpenters tools and techniques can be used to cut panels to size on the job site. Standard panel sizes can be cut and fitted to meet any unusual jobsite or design condition that develops as the job progresses. This adaptability provides a major advantage over precut or other prefabricated systems where in walls must match foundations, floors or other assemblies that frequently go out-of-square or off-of planned dimension.

SUMMARY OF THE INVENTION

The subject invention is directed to a prefabricated building panel assembly comprising a plurality of longitudinally extending, spaced apart, parallel studs and a pair of generally planar outer panels disposed in parallel relationship and affixed to the opposed sides of the array of studs. The outer panels may be generally in register with one another, and may be substantially rectangular, with each panel having a pair of opposed parallel ends and a pair of opposed parallel sides. The outer panels have a length which exceeds the length of the respective studs to which they are attached. More particularly, the outer panels are dimensioned and disposed such that the respective ends of each outer panel extend beyond the ends of the longitudinally extending studs. Additionally, the outer panels and the studs are disposed relative to one another such that the studs are spaced inwardly from the respective longitudinal side edges of the outer panels.

The prefabricated panel assembly of the subject invention may further comprise connecting members. The connecting members may define elongated supports which comprise elongated channels. More particularly, each connecting member may comprise a pair of generally parallel flanges and a connecting web extending therebetween, with the elongated channel being defined between the flanges and the connecting web. The web of each connecting member is dimensioned such that the flanges can be slidably inserted between the opposed outer panels of the prefabricated panel assembly. The flanges may be dimensioned to permit the web to be substantially in line with an end or a side of the outer panels of a prefabricated panel assembly. More particularly, the connecting members are inserted such that the elongated channel thereof is inwardly facing with respect to the prefabricated panel assembly. As a result of this construction, utility lines can be passed longitudinally between the studs of the panel, and can be passed laterally through the channels of the connecting members disposed at the respective ends of the panels.

The connecting members may have a U-shaped cross section or an H-shaped cross section. The U-shaped cross section connecting members typically will be disposed adjacent the opposed ends of the panel assembly or at opposed longitudinal sides which will define an end of a wall section. The H-shaped connecting members may be used to connect a pair of prefabricated panel assemblies in end to end or side to side relationship.

DETAILED DESCRIPTION OF THE PREFERRED EMBODIMENTS

Figure 1:
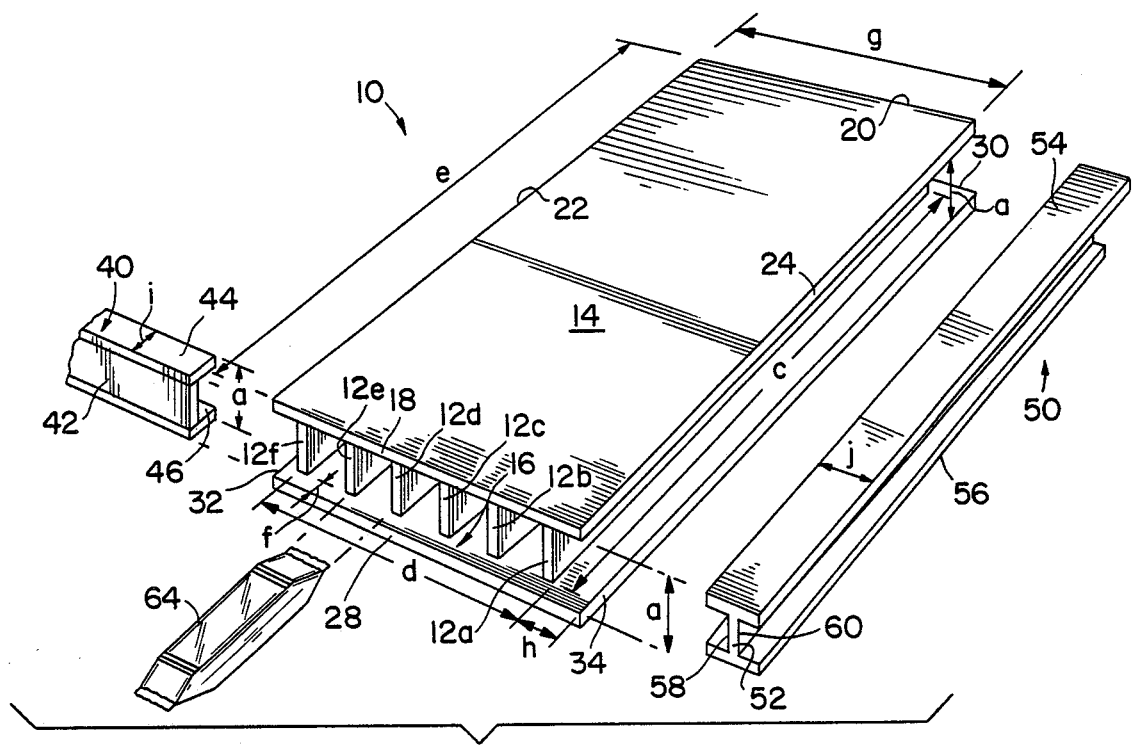
FIG. 1 is an exploded perspective view of a prefabricated panel assembly in accordance with the subject invention.

The prefabricated panel assembly of the subject invention is indicated generally by the numeral 10 in FIG. 1. The panel assembly 10 comprises a plurality of longitudinally extending parallel spaced apart studs 12a–12f and a pair of outer panels 14 and 16 secured to the studs 12a–12f. The studs 12a–12f are generally straight elongated members that may be formed from wood, metal or other appropriate materials, depending upon the architectural and structural specifications of the building. In many embodiments, the studs 12a–12f will be formed from wood, and will have rectangular cross-sections major and minor dimensions "a" and "b". Typically, studs 12a–12f will have nominal cross-sectional dimensions of 2"×3", 2"×4" or 2"×6" or other standard sizes. Although the studs 12a–12f are depicted as being of rectangular cross section, it is anticipated that metallic studs of generally I-beam configuration may also be employed. The spacing between adjacent studs 12a–12b, 12b–12c, etc. will also be determined by system specifications. In many instances, the studs 12a–12f will be disposed on 16" or 24" centers. However, the center to center spacing can be varied in accordance with the particular end use envisioned. The studs 12a–12f are of substantially equal length "c" and are arranged such that the distance between the outwardly facing surfaces of studs 12a and 12f is equal to dimension "d".

The outer panels 14 and 16 are of substantially identical rectangular size and shape and are affixed to the studs 12a–12f to be substantially in register with one another. The outer panel 14 is characterized by opposed parallel ends 18 and 20 and opposed parallel sides 22 and 24. Similarly, the outer panel 16 is characterized by opposed parallel ends 28 and 30 and opposed parallel sides 32 and 34. The outer panels 14 and 16 are oriented such that the opposed side edges 22, 24, 32 and 34 thereof are substantially parallel to the studs 12a–12f.

The outer panels 14 and 16 have a length "e" which is greater than the length "c" of the studs 12a–12f. Additionally, the outer panels 14 and 16 are disposed such that the studs 12a–12f terminate inwardly of the ends 18, 20, 28 and 30 of the respective outer panels 14 and 16. Preferably, the outer panels 14 and 16 are symmetrically disposed along the lengths of the studs 12a–12f. Thus, the studs 12a–12f will terminate inwardly from the ends 18, 20, 28 and 30 of the outer panels 14 and 16 by a distance "f" as shown in FIG. 1.

The outer panels 14 and 16 define a width "g" which is greater than the dimension "d" between the outwardly facing surfaces of the studs 12a and 12f. Additionally, the studs 12a and 12f are spaced inwardly from the sides 22, 24, 32 and 34 of the outer panels 14 and 16 by distance "h". Thus, the outer panels 14 and 16 extend beyond the studs 12a–12f both at the opposed ends 18, 20, 28 and 30 and at the opposed sides 22, 24, 32 and 34.

Figure 4:
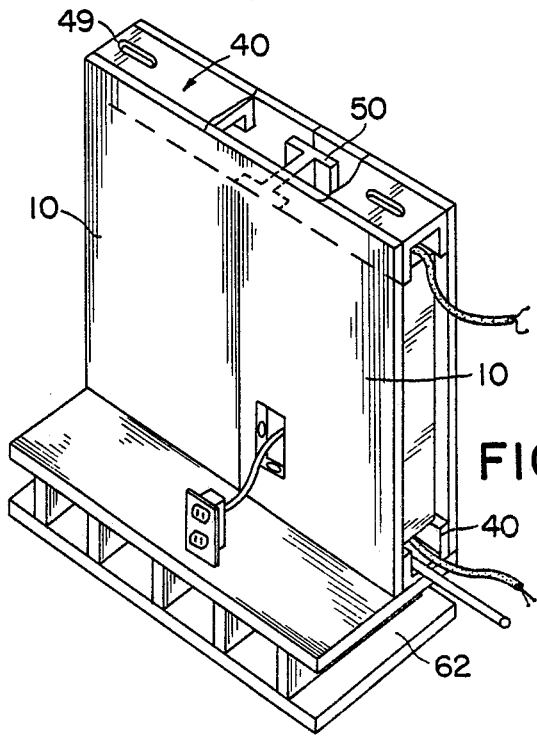
FIG. 4 is a perspective view partly in section showing a portion of a wall formed from the subject prefabricated panels.

The prefabricated panel 10 is employed with an elongated connecting member 40 which has a generally U-shaped cross section. More particularly, the connecting member 40 includes a web 42 and a pair of opposed parallel flanges 44 and 46 connected to and extending from the web 42 to define an elongate channel 48. The web 44 may be solid and continuous as shown in FIG. 1, but may alternatively include spaced apart apertures 49 as shown in FIG. 4 for the passage of utility lines. The distance between the outwardly facing sides of the flanges 44 and 46 is substantially equal to the major cross-sectional dimension "a" of the studs 12a–12f. Additionally, the width of the flanges 44 and 46, as indicated by dimension "i" in FIG. 1, is substantially equal to the distance "f" by which the ends 18, 20, 28 and 30 of the outer panels 14 and 16 extend beyond the ends of the studs 12a–12f. The connecting members 40 may be of unitary construction. However, as illustrated in FIG. 1, the connecting member 40 is formed from separate flange members 44 and 46 which are attached to the web 42 by, for example, nails and/or adhesive.

The prefabricated panel 10 may further be employed with connecting member 50 which is an elongated structure of generally H-shaped cross section. More particularly, the connecting member 50 comprises a web 52 and a pair of opposed parallel flanges 54 and 56 defining opposed elongated parallel channels 58 and 60. The connecting member 50 may be of unitary construction or may be formed from separate flange members 54 and 56 which are affixed to the web 52 as explained with respect to the connecting member 40. The distance between the outwardly facing surfaces of the flanges 54 and 56 is substantially equal to the major cross-sectional dimension "a" of the studs 12a–12f. The width of each flange 54 and 56 is indicated by dimension "j" which is approximately twice the distance "h" by which the side edges 22, 24, 32 and 34 extend beyond the studs 12a and 12f.

Figure 2:
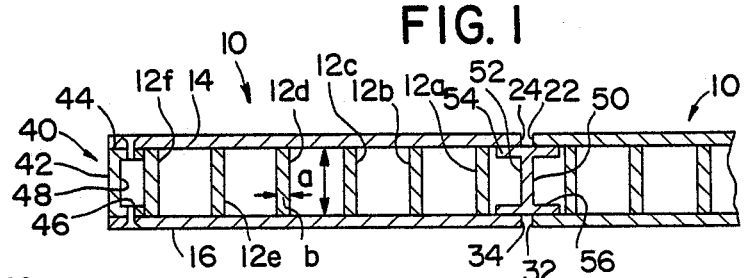
FIG. 2 is a cross-sectional view showing a pair of panels connected in side to side relationship.

As shown in FIG. 2, the connecting member 40 may be slidably inserted between the outer panels 14 and 16 and adjacent the stud 12f of prefabricated panel assembly 10 to define a finished substantially flush side to the prefabricated panel assembly 10 and to position the channel 48 with an inward orientation. The connecting member 40 may be affixed to the inwardly facing surfaces of the outer panels 14 and 16 by adhesive or by nails, screws or the like extending through the outer panels 14 and 16 into the flanges 44 and 46 of the connecting member 40.

As shown most clearly in FIG. 2, a pair of prefabricated panel assemblies 10 may be secured in side to side relationship by employing a connecting member 50. More particularly, the connecting member 50 may be slidably inserted between the outer panels 14 and 16 of one prefabricated panel 10 such that the flanges 54 and 56 thereof are urged substantially adjacent the stud 12a. A second prefabricated panel 10 may be positioned such that the edges 22 and 32 of the outer panels 14 and 16 thereof are slidably advanced over the flanges 54 and 56 of the connecting member 50. The prefabricated panels 10 may then be appropriately secured to the flanges 54 and 56 by adhesives, nails, screws or the like as explained previously.

Figure 3:
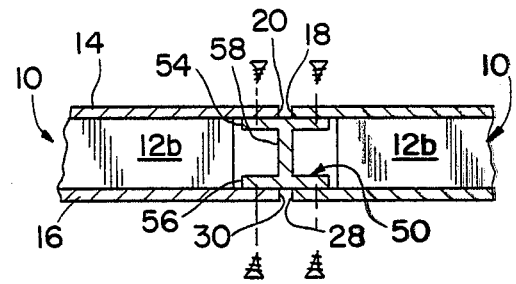
FIG. 3 is a cross-sectional view showing a pair of prefabricated panels connected in end to end relationship.

In a similar manner, as shown in FIG. 3, two prefabricated panel assemblies 10 may be secured in end to end relationship by employing a connecting member 50. More particularly, the connecting member 50 may be slidably inserted between the outer panels 14 and 16 adjacent the ends 18 and 28 thereof such that the flanges 54 and 56 of the connecting member 50 are urged adjacent the ends of the studs 12a–12f. In a similar manner, the second prefabricated panel 10 may be positioned such that the outer panels 14 and 16 thereof are slidably advanced over the flanges 54 and 56 of connecting member 50. The outer panels 14 and 16 may then be secured to the flanges 54 and 56 as explained previously. This assembly defines a pair of transverse inwardly facing channels 58 and 60.

FIG. 4 illustrates one possible application for the prefabricated panel assembly 10 of the subject invention. More particularly, the connecting member 40 may be mounted to a base 60 which may be a floor, a footing or the like and may be another prefabricated panel assembly. The connecting member 40 is disposed such that the web 42 thereof is in face to face contact with the surface 60 and such that the flanges 44 and 46 thereof extend generally perpendicularly upward from the surface 60. The connecting member 40 may be affixed to the surface 60 by nails, bolts or the like extending through the web 42, with the particular connecting means depending upon the materials being employed. The prefabricated panel assembly 10 then is mounted over the connecting member 40 such that the outer panels 14 and 16 slide over the flanges 44 and 46 of the connecting member 40. Additionally, the ends 18 and 28 of the outer panels 14 and 16 are urged substantially into contact with the surface 60. As noted previously, the width of the flanges 44 and 46 substantially equals the dimension "f" by which the ends 18 and 20 extend beyond the studs 12a–12f. Thus, in this fully seated position, the ends of the studs 12a–12f will be supported upon the flanges 44 and 46 of the connecting member 40.

A plurality of panel assemblies 10 may be affixed to an appropriately dimensioned connecting member 40, with the panel assemblies 10 being in side to side relationship as depicted in FIG. 4. More particularly, a connecting member 50 may be slidably inserted between the respective outer panels 14 and 16 of the side to side positioned prefabricated panel assemblies 10. As noted above, the connecting member 50 has a length "c" which substantially equals the lengths of the studs 12a–12f. As a result, the connecting member 50 may be supported on the flanges 44 and 46 of the connecting member 40 substantially adjacent the stud 12a of one prefabricated panel assembly 10 and the stud 12f of another prefabricated panel assembly. The top of the connected prefabricated panel assemblies 10 may be finished by another connecting member 40 to provide a substantially flush top wall which can be connected to other structural components. Alternatively, additional prefabricated panels 10 may be connected in end to end relationship as illustrated in FIG. 3 above.

As illustrated in FIG. 4, the system of prefabricated panel assemblies 10 with the connecting members 40 and 50 can be assembled readily in the field by tradesmen employing well known connecting means such as nails, screws and the like. Additionally, a plurality of prefabricated panel assemblies 10 joined by the connecting members 40 and 50 enables utilities to be extended both longitudinally and laterally within the panels 10. In particular, wires, cables and the like can be extended longitudinally between adjacent studs 12a–12f and can also be extended transversely through the channels defined between the flanges 44 and 46 of connecting members 40 or between the flanges 54 and 56 of connecting members 50. Plumbing or other utility pipes similarly can be extended transversely through the channels defined between the flanges of the connecting members 40 or 50 and longitudinally between the studs 12a and 12f. Furthermore, as illustrated in FIG. 1, insulating material 62 can readily be slidably inserted between the studs 12a–12f either at the point of manufacture of the prefabricated panels 10 or at the place of installation.

In summary, prefabricated panel assemblies are provided with a plurality of spaced apart parallel longitudinally extending studs and a pair of outer panels affixed to the studs. The studs are disposed to terminate inwardly of the respective ends and sides of the prefabricated panels. Elongated connecting members also are provided to join the prefabricated panels to one another or to other structures. The connecting members include a pair of spaced apart flanges joined to one another by a web. The connecting members are dimensioned to be fit between the outer panels of the prefabricated panel assembly and are disposed with the respective flanges and webs defining an inwardly facing channel. Utilities can readily be threaded through the channels defined by the connecting members and/or between the studs of the prefabricated panel.

While the invention has been described with respect to a preferred embodiment, it is apparent that various changes can be made without departing from the scope of the invention as defined by the appended claims.

What is claimed is:

1. A prefabricated building panel assembly for facilitating placement of utility lines, said assembly comprising:
a pair of rectangular outer panels disposed in spaced parallel relationship, said panels each having peripheral edges including opposed parallel horizontal edges and opposed parallel vertical edges;
a plurality of generally parallel spaced apart studs connected to and extending between said panels aligned vertically and generally parallel to said vertical edges and including side studs which are spaced inwardly by a predetermined spacing from the respective vertical edges of said outer panels, said studs having a vertical length between its opposed ends such that the ends thereof are aligned in parallel and spaced inwardly by a predetermined spacing from the respective horizontal edges of said outer panels; and
a plurality of connecting members, each said connecting member comprising a pair of spaced apart substantially parallel flanges and a web connected to and extending between said flanges so as to form a hollow channel defined between said flanges spaced apart by said web, each said connecting member being slidably inserted between the opposed peripheral edges of said outer panels of said prefabricated panel assembly and being dimensioned in correspondence to said predetermined spacings of said studs from the horizontal and vertical edges of said outer panels such that the flanges thereof are in face to face contact with the respective outer panels and are in abutting contact with said studs, including horizontal connecting members being positioned horizontally with respect to said studs with said flanges in abutting contact with the ends of said studs, and vertical connecting members having a vertical length substantially equal to the vertical length of said studs and being positioned vertically in parallel to said studs,
wherein said horizontal and vertical connecting members are disposed such that the webs thereof are spaced from said studs with the respective channels thereof communicating into each other for directing utility lines between said outer panels in directions both parallel and orthogonal to the studs along the horizontal and vertical edges of said panel assembly, and wherein the vertical length of said second connecting member being substantially equal to that of said studs allows the channel of the horizontal connecting members to communicate into other horizontal connecting members of an adjacent panel assembly.

2. A prefabricated building panel assembly according to claim 1, further comprising a second panel assembly of like construction as and abutting in parallel with one side of said first-described panel assembly, wherein the connecting members disposed at said abutting side of said first-described panel assembly are of generally H-shaped cross section with a pair of channels defined between said flanges on respective opposite sides of the web thereof, wherein said flanges of said H-shaped connecting members extend between and are secured to both of said first and second panel assemblies so as to form a joint therebetween provided with channels on each respective side thereof.

3. A prefabricated building panel assembly according to claim 2, wherein the web of said connecting members is substantially aligned with the edges of the outer panels of said first and second panel assemblies.

4. A prefabricated building panel assembly according to claim 1, further comprising a second panel assembly of like construction as and abutting perpendicularly to one side of said first-described panel assembly, wherein the connecting members of said first-described panel assembly disposed at said abutting side are of generally U-shaped cross section with the web thereof substantially flush with the peripheral edges of the outer panels of said first-described panel assembly.

5. A prefabricated building panel assembly according to claim 1, further comprising a plurality of panel assemblies of like construction as said first-described panel assembly, wherein all of said panel assemblies and connecting members are of a standard size and the panels and studs thereof are made of wood, so that they can be cut selectively to fit a given design for structural assemblage of said panel assemblies.

6. A prefabricated building panel assembly according to claim 1, wherein a horizontal side of said panel assembly is abuttingly supported on a floor, footing, or another prefabricated panel assembly or abuttingly supports another structural component, and wherein the horizontal connecting members disposed at said abutting side are of generally U-shaped cross section with the webs thereof substantially flush with the peripheral edges of the outer panels of said panel assembly.

7. A prefabricated building panel assembly according to claim 1, wherein said horizontal connecting members have a length extending substantially to the vertical edges of said outer panels and are abutting supported on the ends of said studs and said vertical connecting members.

8. A prefabricated building panel assembly according to claim 1, wherein said web of said connecting members are formed with spaced apart apertures for the passage of utility lines through said web.

* * * * *